United States Patent [19]

Ward et al.

[11]B 3,913,452

[45] Oct. 21, 1975

[54] REMOTELY MOVABLE PLATFORM

[75] Inventors: Charles Theodore Ward; Donald Lee Mathis; Frank Taylor Radcliff; Richard Vorwerk, all of Chattanooga, Tenn.

[73] Assignee: Combustion Engineering, Inc., Windsor, Conn.

[22] Filed: Aug. 1, 1973

[21] Appl. No.: 384,658

[44] Published under the Trial Voluntary Protest Program on January 28, 1975 as document no. B 384,658.

[52] U.S. Cl. ............ 91/411 R; 180/1 VS; 114/222
[51] Int. Cl.² ......................................... F15B 11/00
[58] Field of Search ............... 251/189, 187, 182; 180/1 VS; 114/222; 91/411

[56] References Cited
UNITED STATES PATENTS

| | | | |
|---|---|---|---|
| 1,262,341 | 4/1918 | Hilliard | 180/1 VS |
| 2,104,062 | 1/1938 | Temple | 114/222 |
| 3,507,352 | 4/1970 | Williamson | 91/411 R |
| 3,609,612 | 9/1971 | Tibbling | 114/222 |
| 3,688,798 | 9/1972 | Nightingale | 251/189 |
| 3,777,834 | 12/1973 | Hiraoka | 180/1 VS |
| 3,811,320 | 5/1974 | Cowell | 73/67.8 S |

*Primary Examiner*—Edgar W. Geoghegan
*Assistant Examiner*—William F. Woods
*Attorney, Agent, or Firm*—Stephen A. Schneeberger

[57] ABSTRACT

A remotely movable carriage is described. The carriage finds particular utility in serving as a mobile platform from which remotely initiated and controlled inspection and work operations might be performed on the tubes in a nuclear steam generator. The carriage includes a stepping mechanism which interacts with a member, such as a tube sheet, relative to which the carriage moves in generally parallel relationship. The stepping mechanism may employ selectively extensible fingers for lateral engagement with openings in the member. Some of the fingers may be movable transversely of their longitudinal extent in a curvilinear direction, relative to the remainder of the carriage, to effect a "stepping" of the carriage.

The carriage may be supported adjacent, and generally below, the member across which it is intended to step, preferably by means for grippingly engaging the member against relative vertical motion. Such gripping means may be expandable, high friction sleeves associated with the stepping fingers for insertion into gripping engagement with the tubes of a steam generator.

17 Claims, 9 Drawing Figures

REMOTELY MOVABLE PLATFORM

BACKGROUND OF THE INVENTION

The invention relates generally to a remotely movable device and more particularly to a carriage with stepping means which may be remotely actuated to move the carriage. More particularly still, the invention relates to a carriage adapted to be maintained in a predetermined spatial relationship with a surface, such as a tube sheet, and means for remotely moving the carriage laterally of the surface.

In a variety of environments it may become necessary to provide a platform or carriage from which various types of work can be remotely conducted. Further, it may be necessary to move the work station relative to the surface or member on which the work is being conducted. Such movement might also have to be effected remotely due to space or biological considerations. A prime example of this need arises in nuclear steam generators where it may be necessary to inspect and/or repair some of the tubes therein. The need for such inspection and/or repair will normally occur following operation of the nuclear system and accordingly, the steam generator is to some degree radioactive. It is not commercially feasible to await decay of the radioactivity before initiating inspection and the level of radioactivity may seriously limit the amount of time a man may be in such environment. In order to perform the necessary work functions it becomes desirable, and possibly necessary, to provide remotely actuable and controllable means capable of performing the work.

In one arrangement a platform is carried into the steam generator by a human, or humans, and is fixedly positioned relative to the tubes and their tube sheet by inserting anchors into one or more tubes. An inspection vehicle which runs on tracks supported by the platform is then remotely drivable to various tube locations within the bounds of the platform. However, because of the limited size of the manway which provides entry to the steam generator, the platform is necessarily small and may cover only a relatively small area of the tube sheet. A large platform which could be assembled within the steam generator is unsatisfactory because the assembly time requires excessive exposure to radiation. However, the smaller platform also requires a human to enter the radiation area several times to move or relocate the platform to "new" areas of the tube sheet. This requires multiple exposures of one person, or more likely, multiple single exposures of several specially trained individuals, either of which is undesirable and expensive.

SUMMARY OF THE INVENTION

According to the invention there is provided a carriage capable of being remotely moved laterally of the surface of a tube sheet or similar such member in supported relationship therewith. The movable carriage is sufficiently small when assembled to permit its entry through a manway in a nuclear steam generator and is sufficiently mobile to transit substantially the entire tube containing surface of a tube sheet without requiring human presence in the generator, other than the initial installation and final removal of the device therefrom. Even this entry might be avoided by use of an extension device for remotely handling the carriage through the manway during installation and removal.

Generally, the carriage of the invention includes a base portion adapted to be supported in close proximity with the tube sheet and a stepping mechanism movably connected to the base and adapted to engage the tube sheet such that relative movement between the stepping mechanism and the base while it is engaging the tube sheet causes movement of the base, and thus the carriage, laterally of the tube sheet. A work performing station, or stations, are mounted on and carried by the platform. The stepping mechanism, or a portion thereof, translates relative to the base in a direction extending parallel the surface of the tube sheet which is also parallel the plane of the base. The stepping mechanism includes at least two anchoring devices capable of being remotely, selectively and independently secured or anchored to the tube sheet or a tube therein, and at least one of which may be translated relative to the base in a direction extending parallel the planes of the base and the tube sheet.

Any of several anchoring means may be employed which are capable of being brought into anchoring or securing engagement with the tube sheet. Such means must resist relative lateral movement between themselves and the tube sheet when in anchoring engagement therewith. They may additionally resist or prevent motion between themselves and the tube sheet in a direction normal to the tube sheet when in anchoring engagement therewith.

The carriage of the invention may utilize the openings or recesses created by the tubes in the tube sheet as "toe" or "finger" holds for remotely actuable anchoring means, such as fingers, associated with the stepping mechanism of the carriage. Two or more fingers are attached to the carriage base and are extendable and retractable relative thereto in a first direction for reversible insertion into the openings created by the tubes. One or more of the fingers is also movable relative to the carriage base a predetermined extent, and in a second direction extending substantially normal to the longitudinal extent of said fingers or stated another way, extending parallel the plane of the frame, for moving the base laterally of the tube sheet surface when said finger is inserted in a tube opening and is moved in said second direction. Support means are provided for maintaining the carriage proximate and substantially parallel the tube sheet to allow insertion of the fingers in the tube openings when they are in their extended position and from which to conduct the necessary work function. These support means may be combined with the finger anchors of the stepping mechanism. Actuating and control means are provided for effecting and remotely controlling movement of said fingers relative to said base in both said first and second directions.

In the preferred embodiment of the invention the fingers are mounted on turntables which are in turn mounted on said base in rotatable relationship therewith. A finger or fingers, on a turntable are mounted off-center, or eccentrically, relative to the axis of rotation of the turntable. When a turntable is rotated, one or more fingers are translated in a second direction relative to the base along a curvilinear path. In this manner the base may be moved laterally of the tube sheet when a finger on a turntable is extended into a tube and the turntable rotated. Another finger, which will have been retracted during rotation of the turntable and may also be eccentrically mounted on a turntable, is carried with the base to its new lateral positioning relative to the tube sheet and is then inserted into a tube, serving as the newly placed finger relative to which the next stepping operation occurs. Where the tube end pattern is uniformly repetitive in a particular direction, two fingers may be located on a single turntable and spaced from one aother a distance corresponding to an integer number of distances between adjacent tube ends in the particular direction.

DESCRIPTION OF THE PREFERRED EMBODIMENTS

There follows a description of two remotely movable carriages separately embodying different means for moving anchoring members.

Figure 1:
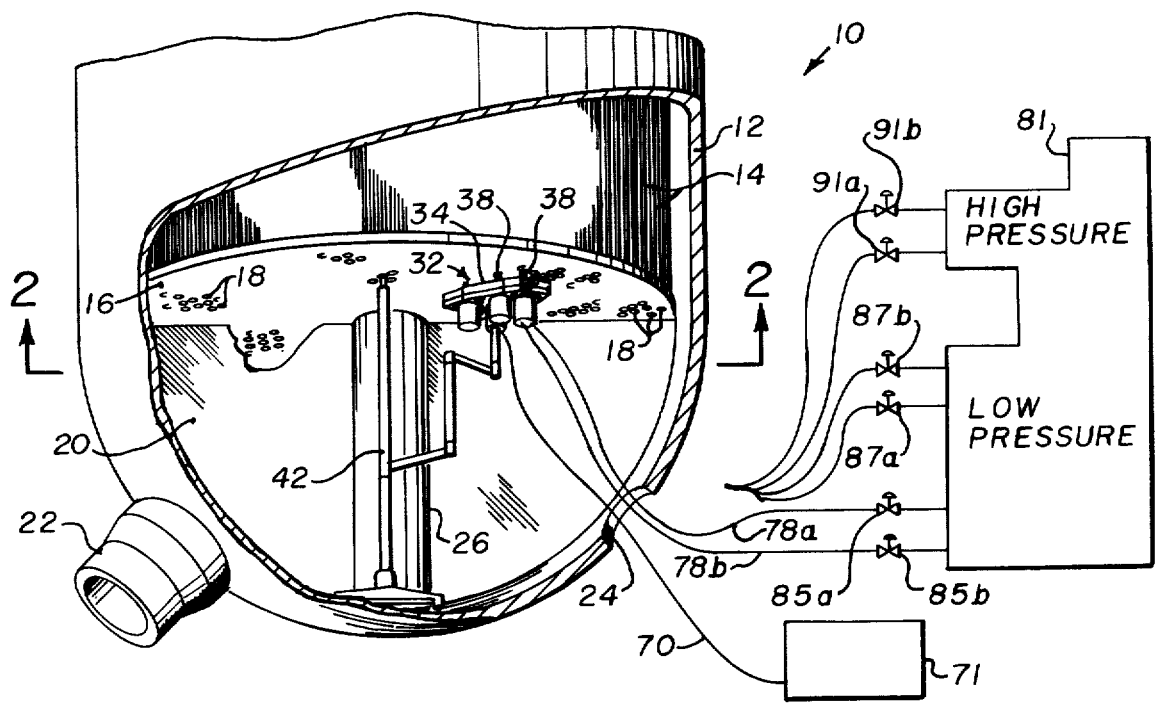
FIG. 1 is a cutaway perspective view of a steam generator showing the carriage of the invention operatively positioned therein.

Referring now to FIG. 1 there is depicted a typical nuclear steam generator 10 including a vessel 12 having a large number of tubes 14 supported therein and terminating at one or both ends of a tube sheet 16. In the steam generator 10 depicted, the vessel 12 and tubes 14 are generally vertically oriented with the tubes being of an inverted U-shape with both ends of the tubes terminating in or slightly below, the generally horizontally extending tube sheet 16. The tubes 14 are circular and extend through generally cylindrical passages extending vertically through the tube sheet 16 and are snugly and securely affixed therewithin. The tubes 14 terminate at or slightly below the lower surface of tube sheet 16 creating circular, vertically extending openings 18 extending upwardly in the tube sheet.

Tube sheet 16 is supported within vessel 12 in spaced relationship with the bottom of the vessel. Typically, the tube sheet is generally circular, being 10 feet to 15 feet in diameter, and is 4–6 feet above the bottom of the vessel. A vertical dividing member 20 divides the region of the vessel below tube sheet 16 into equal halves for inlet and outlet of primary fluid, one-half only being seen in FIG. 1. Each half includes a nozzle 22 for ingress or egress of fluid and a manway 24 to permit a human access to the interior of the steam generator below tube sheet 16. A cylindrical support column 26 may extend vertically between the bottom of vessel 12 and tube sheet 16 centrally thereof and provide support to the tube sheet.

Figure 2:
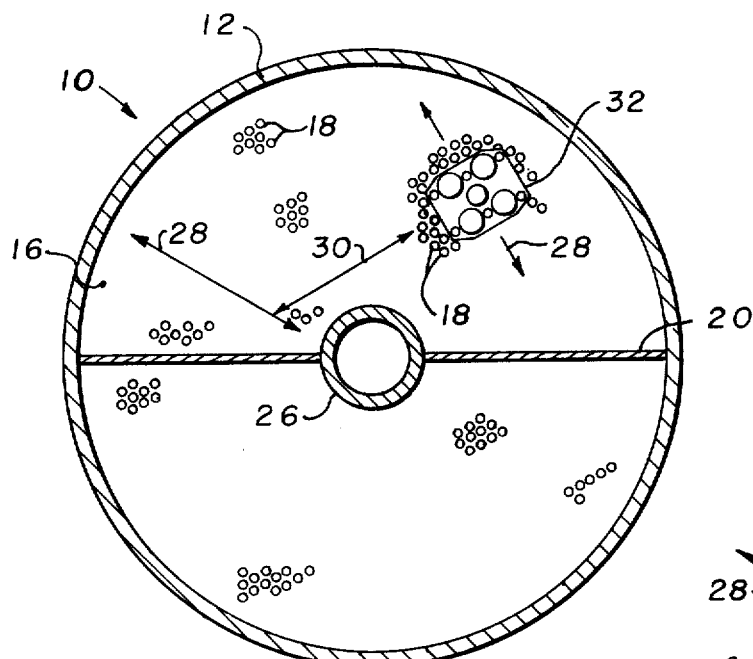
FIG. 2 is a transverse section of the steam generator taken along line 2—2 of FIG. 1 to show the patterning of tube ends.
Figure 3:
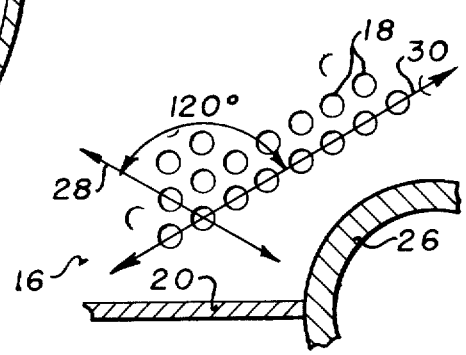
FIG. 3 is a portion of FIG. 2 enlarged to more accurately show the pattern of the tube ends in the tube sheet.

In a "U" tube type steam generator, one end of each tube 14 is on one side of dividing member 20 and the other end is on the other side. Typically, a steam generator may have 8,000 – 9,000 tubes. One typical pattern in which the ends of the tubes 14 are arranged in tube sheet 16 is seen in FIGS. 2 and 3. This pattern of tube 14 ends, or similarly, of openings 18, has an equilateral triangular pitch. By triangular pitch, it is meant that the straight rows of openings 18 which intersect one another and share a common hole do so at an angle other than 90°. In the steam generator herein described, this angle of intersection is 120° (or its supplement 60°), as defined by directional arrows 28 and 30 in FIG. 3. This arrangement comprises a conntinuous series of equilateral triangles. Adjacent rows are offset from one another to create this pattern. In another pattern, not shown here, the openings 18 may have a square or rectangular pitch in which rows of holes which intersect one another and share a common hole do so at an angle of 90°. An isosceles triangular pitch is still another pattern.

In the triangular patterning of tubes shown in FIGS. 2 and 3, except at the periphery, all openings 18 will be equiangularly encircled by six other openings 18, each the same uniform distance from the central opening. Typically, the internal diameter of a tube 14, which generally defines opening 18, is about 0.625–0.75 inch. The distance between centers of adjacent tubes 14 having the above-mentioned uniform spacing is 1 inch. This distance is later referred to as the "unit distance."

According to the invention there is provided a carriage 32 capable of being remotely moved laterally substantially parallel to the lower surface of tube sheet 16. Carriage 32 in this embodiment is intended for use as a work-platform from which various remotely controlled operations may be performed. In the embodiment described herein, carriage 32 may serve as a platform or support for non-destructive testing equipment, such as an eddy-current probe. Alternatively or additionally, it may be used as a platform from which repair procedures on a particular tube 14 are initiated. Additional explanation of such capabilities will follow a description of the carriage 32. Carriage 32 is shown disproportionately large, relative to manway 24 and tube sheet 16 in FIGS. 1 and 2, in the interest of clarity.

Figure 4:
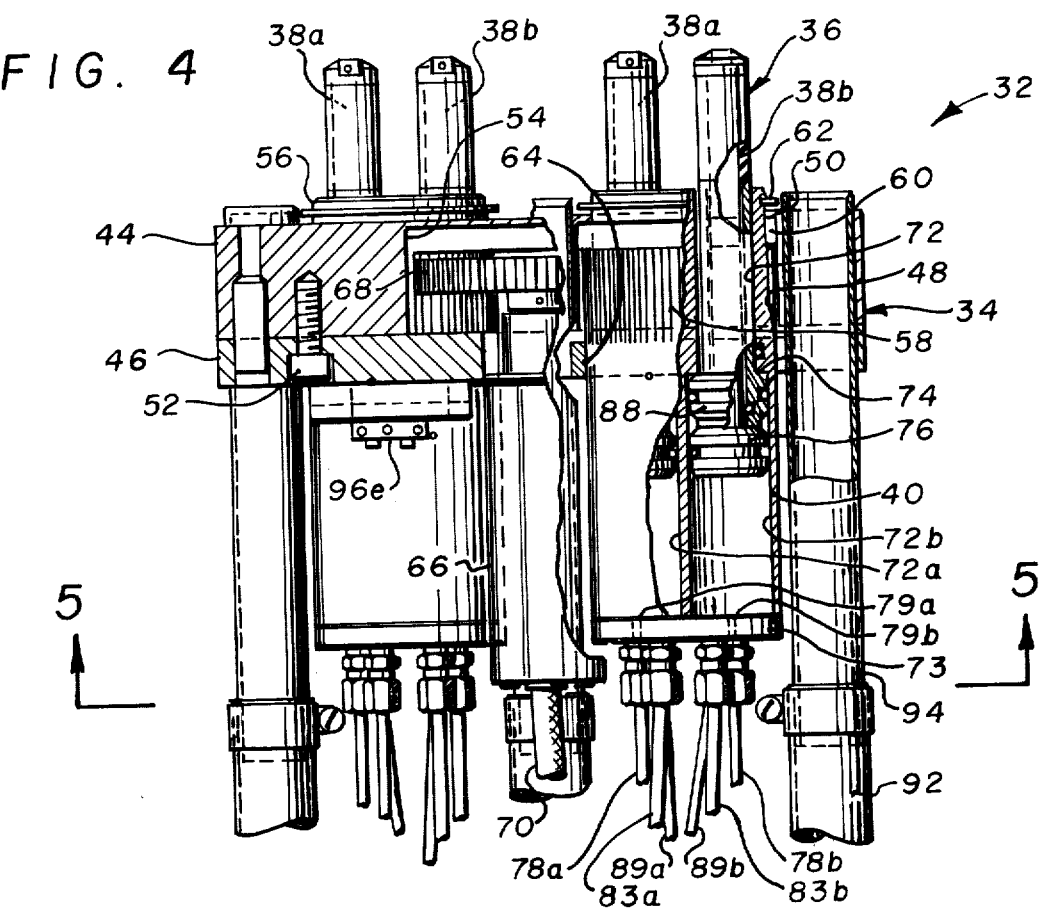
FIG. 4 is an elevational view of a carriage utilizing turntables for translating the anchoring means, parts are cutaway for clarity.
Figure 5:
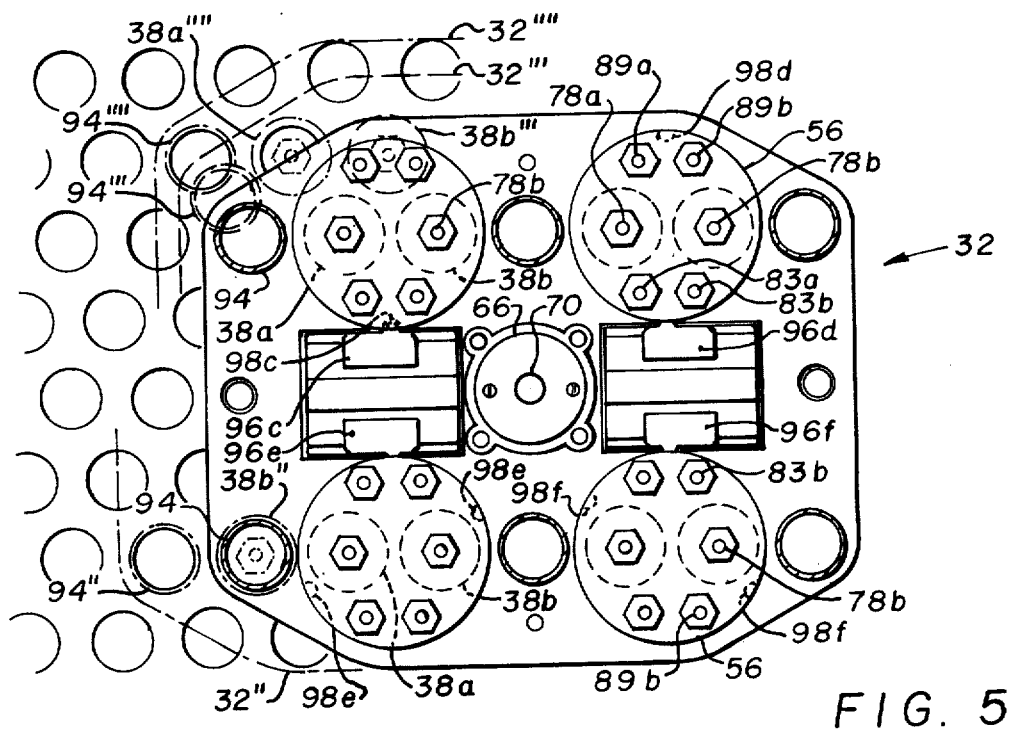
FIG. 5 is an underside view of the carriage of FIG. 4 taken along lines 5—5 thereof and showing the carriage in several "stepped" positions.

One embodiment of carriage 32 is depicted in FIGS. 4 and 5 and comprises essentially a base member 34 and a stepping mechanism 36 connected to said base 34. Stepping mechanism 36 is adapted to be limitedly moved relative to base 34 in a manner which propels the base parallel the surface of tube sheet 16. The stepping mechanism 36 includes two or more anchor members such as substantially rigid, parallel fingers 38 extending outwardly from base 34 and at least one of which is connected to said base by means of one or more turntables 56. Fingers 38 provide the anchor means which may be used to resist lateral movement between them and the tube sheet 16. In the embodiment depicted, each finger 38 is movably connected to a turntable 56 which is in turn movably connected to base 34. The fingers 38 are adapted to be selectively inserted into and withdrawn from various openings 18 of tubes 14, and the base 34 is adapted to be moved in a plane substantially normal to the longitudinal extent of the fingers when certain of the fingers are withdrawn from the openings. This latter movement may be accompanied by a lateral repositioning of the withdrawn fingers relative to particular openings 18. By appropriate control of the direction and extent and number of fingers experiencing this latter movement, those fingers 38 withdrawn during such movement may be repositioned in alignment with a different opening 18 than previously, thus causing the base 34, and accordingly carriage 32, to "walk" or "step" across the under surface of tube sheet 16. The carriage 32 is supported closely below the tube sheet 16, preferably by special gripping means associated with fingers 38, or alternatively or supplementally by a support structure such as support stand 42, both of which will later be described in greater detail.

It will be appreciated that other anchor means than fingers 38 might also be utilized in propelling and/or supporting base 34 of carriage 32. Such other anchor means might take the form of switchable magnets, or possibly suction cups. These means might be particularly suited to stepping the platform when some of the openings 18 at the ends of tubes 14 are blocked, as by a plug. In such instance, anchor means which do not rely on the presence of an opening might be preferred.

Referring to FIGS. 4 and 5, base 34 comprises a gear case 44 and a gear case cover 46 for close, rigid engagement therewith. Gear case 44 is an inch or two in thickness and has a lateral extent generally less than 16 inches in order to allow its introduction to the steam generator 10 through manway 24. Cover 46 has substantially the same limiting lateral dimensions as case 44. Each gear case 44 includes two, and preferably four cylindrical bores 48 extending vertically therethrough, said bores each being of one diameter over most of their length and of a smaller diameter along the uppermost extent thereof to create a retaining shoulder 50. Cover 46 includes vertical cylindrical bores therethrough of the same diameter as the large diameter portion of bores 48 and in registry therewith when the case 44 and cover 46 are rigidly joined, as by screws 52, to form base 34.

Each bore 48 is preferably equally spaced from the center of case 44 and a further cylindrical bore 54 extends vertically in the case and is concentric with the center thereof. Cover 46 includes a bore of smaller diameter than, but concentric with bore 54. Bore 54 is of sufficient diameter that it is coincident with the radially outermost portion of each bore 48 along a small arc portion of each.

A vertically elongated cylindrical turntable 56 is structured to be rotatingly housed at each bore 48. A turntable 56 may be rigid, preferably of metal, and substantially solid. Each turntable 56 is of somewhat smaller diameter than its housing bore 48. Turntable 56 is of somewhat reduced diameter near and along its upper end creating a support for bearing 60 disposed thereabout. An annular recess about turntable 56 above the support for bearing serves as a seat for a lock-ring 62. Retaining shoulder 50 limits upward movement of bearing 60 and thus turntable 56. Lock-ring 62 is mounted on turntable 56 such that it is above shoulder 50 and thus limits downward movement of the turntable relative to base 34 and accordingly, the turntable is substantially fixedly positioned axially relative to the base.

Each turntable 56 extends downwardly through the bore in cover 46 and may extend several inches below the cover. Bearinng 64 encircles turntable 56 in its region of coextensivity with cover 46 and provides lateral support for the turntable and facilitates rotational motion relative thereto.

A reversible motor 66 of a well-known type is securely mounted to the under surface of gear case cover 46 against rotation and vertical movement relative thereto. The rotor shaft of motor 66 extends vertically through the central bore in cover 46 and upwardly into the bore 54 in gear case 44. A horizontally disposed sun gear 68 is affixed to the rotor shaft of motor 66 within gear case 44. Sun gear 68 is of such positioning and such size that it is radially in contact with the outer periphery of each turntable 56, and more specifically, is in non-slip driving engagement with the gear teeth 58 thereon. Electrical conductors for controlling energization of motor 66, and accordingly sun gear 68, are housed within conduit 70 and extend through manway 24 to a motor control unit 71. Position sensing means, such as one or more limit switches 96 are associated with one or more of the turntables 56 to provide an indication of the rotational orientation of the turntables relative to base 34. Such position indicating means may be used in a known manner to indicate particular rotational orientations of the turntables 56 and may feed signals back to motor control unit 71 through a conduit such as 70, to permit manual or automatic control of the energization and de-energization of motor 66.

In the present embodiment a pair of fingers 38a and 38b are supported by, or more accurately housed within, each turntable 56. Each turntable 56 includes two cylindrical bores 72a and 72b extending vertically substantially entirely therethrough with the bottom end of each bore being closed and sealed in fluid-tight relationship by a cover member 73 extending across the lower end of the turntable. The subscripts a and b are used hereinafter whenever it is necessary to distinguish to which of the two fingers 38a or 38b a particular item applies. The axes of the two cylindrical bores 72a and 72b in a particular turntable 56 are spaced from one another a distance corresponding to the distance between centers of a pair of openings 18 in tube sheet 16. In this embodiment this distance between axes of a pair of cylinders 72a and 72b corresponds to the distance between centers of the closest adjacent pair of openings 18, the "unit distance." Further, the bores 72a and 72b are each equidistantly disposed on opposite sides of the centerline or axis of rotation of turntable 56. The axes of cylindrical bores 72a and 72b and the centerline of turntable 56 are in a common plane.

Each bore 72 is approximately six inches in length and is of greater diameter along the lower half of that length creating a downwardly facing stop surface 74 at the transition between the larger and smaller diameter. This lower, larger diameter portion of bore 72 may be referred to hereinafter simply as "cylinder 72." A finger 38 is slidingly disposed within each of the cylindrical bores 72 and may be some four to six inches in length, finger 38a being in cylinder 72a and finger 38b being in cylinder 72b. A piston 76 is rigidly affixed to the lower end of each finger 38 and is sized diametrically to be in close sliding engagement with the large diameter portion of each bore 72, but is of larger diameter than that of the upper portion of the bore 72, such that its upward extent of travel is limited by stop 74. Piston 76 and finger 38 are of such axial length that the upper end of the finger is withdrawn below the upper surface of turntable 56 or base 34 when the piston is in its fully retracted position against cover member 73 as seen in cylinder 72a of FIG. 6. Each piston 76 and the large diameter portion of cylindrical bore 72 are sized axially such that the finger may experience a stroke length between its fully extended and fully retracted positions of 1–3 inches. All of the fingers 38 in FIG. 4 are shown in the fully extended position. Each piston 76 includes an O-ring thereabout for sliding, sealing contact between the piston and the wall of cylinder 72.

A driving fluid such as air from supply 81 is admitted respectively to cylinders 72a and 72b below pistons 76 through fluid conduit means 78a and 78b respectively. Conduits 78a and 78b connect respectively ports 79a and 79b communicating with the lower ends of bores 72a and 72b with air supply 81 through control valves 85a and 85b respectively. By admitting fluid to the cylinder 72 below piston 76, the piston and its associated finger 38 are moved upwardly to the fully extended position. By venting fluid from the lower end of cylinder 72 through port 79 and conduit 78, the finger 38 and piston 76 may descend to the retracted position by gravity. However, it is preferable to drive the piston and finger downwardly to the retracted position by means of air admitted above piston 76 through port 80a or 80b, seen in FIG. 6, in cylinder 72a or 72b respectively which axially is near stop 74 and is above part of the upper surface of piston 76 when the latter is in its fully extended position. Fluid conduits 83a and 83b respectively connect air ports 80a and 80b with air supply 81 through control valves 87a and 87b respectively.

The various control valves mentioned herein may be manually controlled or they may be automatically controlled in a particular sequence in accordnace with a pre-established program. Also, they are of a type which connect the various cylinders with the air supply in one state and vent the cylinders to the atmosphere in another state.

Each finger 38 is of course of smaller diameter than the diameter of the opening 18 into which it is to be inserted. It is preferable, however, that there be no great lateral clearance between the finger 38 and the wall of opening 18 in order to prevent misalignment when the carriage 32 is moved laterally of the tube sheet 16. As described immediately below, a deformable sleeve surrounds finger 38 and occupies most of the region between the finger and the wall of an opening 18. The pitch spacing of the several fingers 38 is accurately established such that the fingers may be concentric with the tubes 14 into which they are inserted.

In the preferred embodiment of the invention each finger 38 includes an axially extending portion near its upper end which is of substantially smaller diameter than the diameter of openings 18 or tubes 14 and which is encircled by a tubular sleeve 82 of flexible or resiliently deformable material. The material of sleeve 82 is preferably elastically deformable and has a high coefficient of friction. Such materials might include rubber, elastomers of rubber base or elastomers of plastic base, such as polyurethanes.

A stop or laterally extending, longitudinally downward facing lip 84 is removably affixed to the upper end of fingers 38 above deformable sleeve 82 and extends radially outward beyond the inner diameter of sleeve 82. A rigid tubular sleeve 86 slidably encircles each finger 38 along its lower extent below deformable sleeve 82 and also extends radially outward beyond the inner diameter of sleeve 82, thus forming an upwardly facing lip against the undersurface of the deformable sleeve 82. Both the downward facing surface of stop or lip 84 and the upward facing surface of rigid sleeve 86 may be inclined or dished to provide seats for laterally retaining the ends of sleeve 82. A piston 88 is affixed to sleeve 86 near its lower end and slidably encircles finger 38. Each piston 88 is of essentially the same diameter as the pistons 76 associated with each finger 38 and includes an O-ring thereabout for sliding, fluid sealing contact between the piston and the wall of cylinder 72. In this arrangmeent piston 88 is positioned intermediate piston 76 and stop 74 and, accordingly, piston 88 will contact stop 74 when piston 76 is driven upwardly to its extended position which is now slightly below that previously described. The underside of piston 88 thus serves as the stop limit for piston 76 in its upwardly extended position. It is preferable that both pistons 88 and 76 have axially upwardly extending projections or lands which will contact the surface immediately thereabove thus spacing the remainder of the upper surface of each of the pistons from the contacted surface thereabove. This exposes a working surface to a driving fluid admitted to the cylinder above the piston, as for instance from port 80, when the pistons are fully extended.

Figure 6:
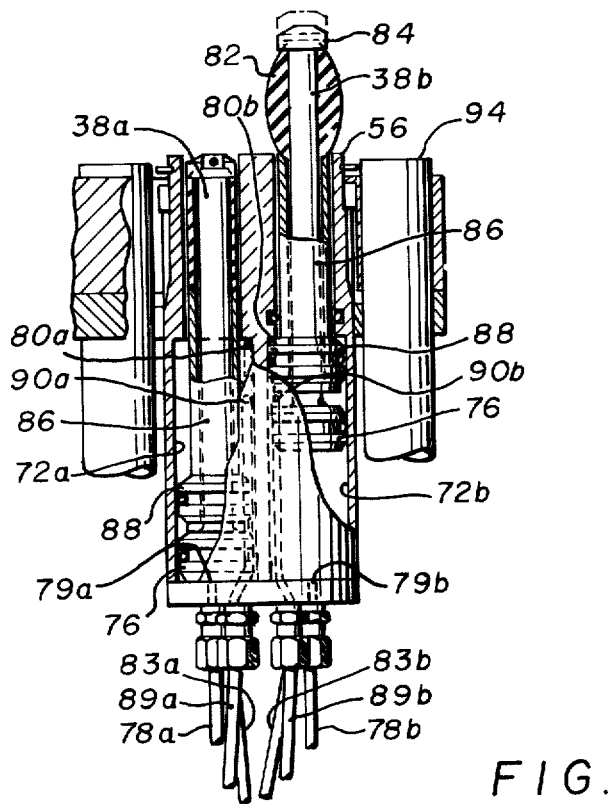
FIG. 6 is a sectional view of the anchoring fingers associated with the invention showing one fully retracted and another fully extended and expanded.

The finger 38a seen in the left hand side of the turntable 56 in FIG. 6 is shown in the fully retracted position and, as described above, the fingers depicted in FIG. 4 are shown in the fully extended position. The finger 38b appearing in the right hand side of FIG. 6 is in what is referred to as the extended and expanded configuration. This configuration is attained in the following manner. Piston 76 and accordingly piston 88 are driven to their extended limit positions. Ports 90a and 90b are located along cylinders 72a and 72b respectively such as to communicate with the space between the upper surface of piston 76 and the lower surface of piston 88 when they are in the upwardly extended position. Fluid conduits 89a and 89b respectively connect ports 90a and 90b with air supply 81 through control valves 91a and 91b respectively for admitting and venting driving fluid respectively to and from cylinders 72. By increasing the force on the upper surface of piston 76 to a greater force than that exerted on the lower surface of that piston, it will be caused to move downwardly relative to piston 88 and sleeve 86, carrying finger 38 with it. The downwardly facing lip 84 on the upper end of finger 38 is caused to move relatively toward the upwardly facing lip created by the upper end of rigid sleeve 86. This serves to axially compress the deformable sleeve 82 which may not deform radially inwardly because of the existence of finger 38 and accordingly, is forced to expand radially outwardly.

Deformable sleeve 82 is of such diameter in its relaxed or contracted state that it will fit slidably within an opening 18. However, when driving fluid of sufficient pressure is admitted through port 90 to the space between pistons 88 and 76, finger 38 and rigid sleeve 86 move axially relative to one another a sufficient amount to deform and expand sleeve 82 radially sufficiently that it snugly engages the inner walls of opening 18 or tubes 14. In effecting this expansion of sleeve 82, finger 38 will be caused to move downward relative to turntable 56 from the position shown in phantom to that shown in solid line in FIG. 6. This distance may typically be 15–30 percent of the length of sleeve 82. Limiting means, not shown here, may be associated with and interact between the sleeve 86 and finger 38 to limit the movement therebetween to avoid forcing sleeve 82 over lip 84 or sleeve 86. By selectively sizing the operating surface areas of pistons 88 and 76 and by controlling the pressure of driving fluid applied to cylinder 72 through port 90 and by selective sizing of the diameter of sleeve 82 and choice of the coefficient of friction thereof, it is possible to grippingly engage the walls of openings 18 with sufficient force that each finger 38 is capable of supporting an axial load of upward of 50 pounds. It is thus evident that the fingers 38 with deformable sleeves 82, in the expanded configuration, are capable of supporting the entire carriage 32, depending on its weight and the number of sleeves 82 grippingly employed. Typically carriage 32 may weigh between 20 and 40 pounds and at least four gripping sleeves 82 of the embodiment depicted in FIG. 4 will always be in gripping engagement with openings 18 in a manner to be hereinafter described. While a resiliently deformable sleeve 82 has been disclosed as preferred for gripping engagement with the interior surface of a tube 14 defining a hole 18, it will be appreciated that other means such as a fluid inflatable bladder or an expandable collet or arbor may be substituted.

A description of the operation of carriage 32 follows. All of the fingers 38 are in the withdrawn or retracted position and the carriage 32 is placed close to or against the undersurface of tube sheet 16, as by means of a man briefly entering steam generator 10 through a manway 24 or by remotely handling the apparatus from outside the manway. Carriage 32 is positioned such that the several fingers 38 are aligned with several corresponding openings 18. It should be noted at this point that the turntables 56 are positioned and spaced, as are the fingers thereon, such that when the fingers of one turntable are aligned with holes 18, the fingers on the other turntables are also. With carriage 32 temporarily positioned closely below tube sheet 16, driving fluid is admitted through conduit 78 to each cylinder 72 below finger piston 76. This moves the fingers 38 upwardly to their extended position which inserts them into the openings 18. While continuing to temporarily maintain a support on carriage 32 and a small air pressure against the undersurface of the pistons 76, driving fluid is admitted to cylinders 72 via each of the ports 90. This driving fluid is at a pressure, generally several times greater, than that admitted through conduit 78 as the working area of the piston with which it is in contact is smaller than the undersurface of pistons 76 and it must overcome the upward force on piston 76. Typically, air source 81 will have a high pressure (125 psi) outlet and a low pressure outlet (50 psi). With the admission of driving fluid through ports 90, finger 38 is forced downwardly relative to rigid sleeve 86 serving to axially compress and radially expand the deformable sleeve 82. Sleeve 82 is expanded into engaging contact with the inner surfaces of opening 18, with each deformable sleeve 82 thus serving to support a portion of the weight of carriage 32. The number of gripping sleeves 82 is sufficiently great and the weight of the carriage 32 sufficiently small that the carriage is easily supported by the expanded sleeves with no need for additional support. Carriage 32 at this time serves as a stable platform from which various work operations may be conducted.

One example of the work which may be remotely conducted is the inspection of one or more tubes 14 by means of eddy current probes which may be remotely inserted into the tubes through openings 18. Such eddy current probes are introduced to openings 18 via conduits, such as hollow cables 92, which are connected to the lower end of one or more vertically extending cylindrical tubes 94. Tubes 94 are carried by and may extend through carriage 32 or may be formed by a cylindrical bore therein and are laterally positioned relative thereto in the embodiment shown such that they are in vertical alignment with an opening 18 when all of fingers 38 are inserted into certain other openings 18. With the probe tubes 94 arranged as shown in FIG. 5, they will be aligned with holes 18 when the turntables 56 are rotated 180° from the angular orientation shown or following two 60° rotations in opposite directions, as will be described more thoroughly below. Preferably, tubes 94 are situated laterally outward of the turntables 56 and fingers 38 so that one or another of the tubes 94 may be placed in vertical alignment with every tube 14 on tube sheet 16, even those at the perimeter. In the preferred embodiment there is at least one probe tube 94 at the four diagonally opposite corners of carriage 32. Hollow cables 92 extend from tubes 94 out through manway 24 to a remote station from which an operator may control the insertion of probes or the like into tubes 14 from their temporary positioning within tubes 94.

In the embodiment described herein, a simple work-performing station, or stations, such as fixed by positioned probe tubes 94 are considered. In a mmore complex or sophisticated usage of carriage 32, it might include a multi-functioned work station. For instance, the work station might have the capability of introducing a probe into tubes 14, brushing the tube ends, sizing the tube ends, inserting a plug in the tube ends, welding the plug into the tube and/or inspecting the weld. These various functions would be performed by different tools using carriage 32 as a work platform. The several tools might also be so mounted on carriage 32 that they would be remotely movable relative thereto to place different ones in registry with an opening 18 at different times or stages of inspection and repair operations. Following completion of a work operation or a series of work operations at a particular location or positioning of carriage 32, it will usually be necessary to move the carriage laterally of tube sheet 16 to another work location.

Such movement of the carriage is accomplished by a "stepping" or "walking" operation. Stepping of the carriage is accomplished following withdrawal of one finger of each pair of fingers 38a and 38b on each turntable 56 from insertion within opening 18. That finger 38 selected for withdrawal is the same on each of the turntables 56 or stated another way, occupies the same rotational orientation relative to the axis of rotation of the turntable. For example, assume that each finger 38b is to be withdrawn. The sleeves 82 on those fingers are relaxed and the fingers withdrawn. Following withdrawal of those fingers 38b, motor 66 is energized to rotate gear 68 which in turn rotates all of the turntables 56 relative to base 34 the same angular extent. Means such as a proximity switch not shown, may be located in the lower end of each cylinder 72 to indicate that a finger is fully withdrawn. The angular extent of the rotation is that sufficient to place the retracted fingers 38b in vertical alignment with a predetermined "new" opening, or openings, 18 not previously occupied by fingers immediately prior to the stepping operation. When this rotation is completed fingers 38b are re-extended into "new" openings 18 and expanded into gripping engagement with the walls thereof. During rotation of the turntables 56 the other fingers 38a on each will have remained extended and expanded in gripping engagement within the openings 18 of tube sheet 16 and the turntable, the fingers 38b thereon, and the base 34 will all describe curvilinear translational movement relative to fingers 38a. Each subsequent stepping operation is performed in the same manner, however the fingers 38 which are withdrawn and rotated will generally alternate between 38a and 38b from step to step, particularly if the resultant motion of carriage 32 is advancing in one direction in a straight line. The carriage 32 will describe a cuspated path or a serpentine path along the straight line resultant, depending on whether or not the direction of rotation of turntables 56 is reversed each step.

In order to withdraw a finger 38 to effect a stepping operation, sleeve 82 is first removed from gripping engagement with the wall of opening 18 by allowing it to axially extend and radially contract. This accomplished by venting or removing the fluid pressure on the upper surface of piston 76 via port 90. Once sleeve 82 no longer engages opening 18, finger 38 may be retracted or withdrawn. This may be accomplished by the introduction of driving fluid to the upper surface of piston 88 via port 80. The lower portion of cylinder 72 is or will have been vented through port 79.

The underside plan view of carriage 32 in FIG. 5 is useful in showing the motion described by base 34 relative to fingers 38 during a stepping movement. It also shows the change in positioning of carriage 32 relative to the tube sheet 16. Further it shows the placement of limit switches. For purposes of describing the stepping motion, the leftmost fingers 38a on each turntable 56 in the solid line drawing will be presumed to be in gripping engagement within openings 18 of tube sheet 16 and accordingly are non-movable laterally relative thereto. Fingers 38 are free to rotate within cylinders 72. The right-hand fingers 38b in the solid line drawing are retracted for the stepping operation. If turntable 56 is rotated through an angle of 180° relative to base 34 from the orientation shown in the solid line drawing, the carriage 32 will be in the position represented by the dotted line representation of the carriage designated 32''. The positioning of carriage 32'' places each finger 38b in vertical alignment with a new or different opening 18 for insertion thereinto and tube 94'' is also in vertical alignment with a new opening 18. The carriage 32 will have advanced along a straight line parallel the previous alignment of its fingers, as for instance indicated by directional arrows 28 or 30 in FIG. 3, but will have done so by describing a curvilinear translational path relative to fingers 38a and the tube sheet 16.

The dotted line drawing of carriage 32''' depicts the positioning of carriage 32 relative to its initial positioning following a rotation of the turntable 56 counter-clockwise (in FIG. 5) through an angle of 60° with finger 38a in gripping engagement and finger 38b retracted. It will be noted that, for the positioning shown of tubes 94 on base 34, the tubes 94''' are not aligned with an opening 18 following the single 60° rotation. However, a second 60° rotation of turntables 56 in the opposite (or clockwise) direction from the initial rotation and in which now finger 38b is extended and in gripping engagement and finger 38a is retracted will result in the positioning indicated by carriage 32'''' and probe tube 94''''. Tube 94'''' will now be aligned with an opening 18. In the above two descriptions (180° and double 60°) the carriage may be moved in two intersecting straight line directions making an angle of 60°, 120° to one another. Using the above descriptions of 180° and double 60° movement, the carriage may be moved and aligned in three reversible directions at 60° to one another, two such directions being shown in FIG. 3. For rapid traverse in the horizontal direction in FIG. 3, alternating 120° steps may be employed.

The two phase, or double 60°, step described above might be avoided by judicious angular placement or two probe tubes 94 at each corner, however this is not felt to be warranted. Further, the two phase step might also be avoided by locating the fingers 38a and 38b on a turntable 56 such that one finger extends along the axis of rotation of the turntable and the other is radially offset therefrom by some integral multiple of the unit or minimum spacing between the centers of the closest pairs of holes 18 on tube sheet 16. This would generally be a single unit spacing. However, this configuration may also not be optimal because it requires each turntable to be of substantially twice the diameter as that required for the above described preferred embodiment. This requirement adds significantly to the overall lateral size of carriage 32 and may not permit its passage through manway 24. Also, the increased size adds unneeded, and possibly intolerable, weight, though some voids on the "empty" side of the turntable could aid somewhat.

Preferably the motor 66 may be controlled so as to rotate turntables 56 relative to base 34 through angles of 60°, 120° and 180° in either the clockwise or counterclockwise directions. This may be accomplished, as earlier mentioned, by the proper placement of position sensing means, such as limit switch 96, relative to the turntables 56. This might be done in any of a variety of ways including circular placement of a plurality of angularly displaced limit switches and a single actuating means for movement relative to the switches, or circular placement of a plurality of angularly displaced actuating means and a single switch for movement relative thereto.

Figure 7:
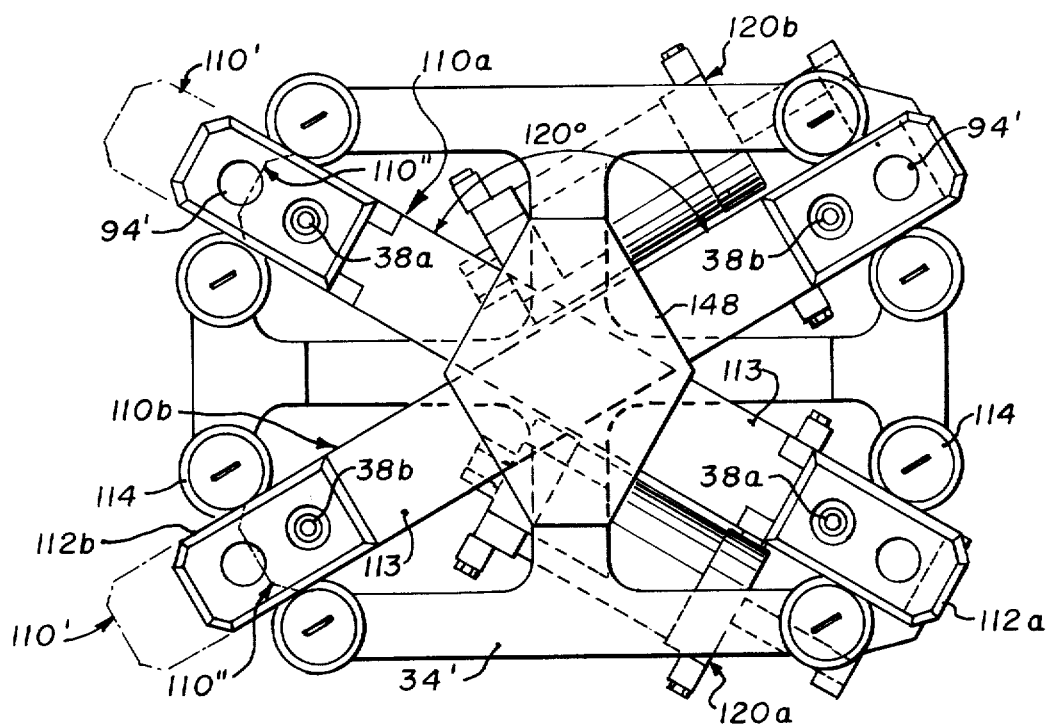
FIG. 7 is a plan view of a carriage utilizing sliders for translating the anchoring means.

However, in the preferred arrangement, a limit switch 96 is associated with each of the four turntables 56 and is rigidly mounted to base 34 on the underside of gear case cover 46. The four limit switches are designated 96c, 96d, 96e and 96f for further reference to indicate that each coacts with a separate turntable 56. That turntable 56 associated with switch 96c includes switch actuating means, such as recess 98c in the outer perimeter thereof, angularly disposed to actuate switch 96c when the several turntables are in a 0° or reference angular orientation relative to base 34, as seen in FIG. 7. A recess 98d in the turntable 56 associated with switch 96d is angularly located to actuate the switch when the turntables are in a 180° angular orientation relative to the 0° reference. A pair of recesses 98e in the turntable 56 associated with switch 96e are angularly located to actuate their switch when the turntables are in either a 60° or a 240° angular orientation in a particular direction of rotation relative to the 0° reference. A pair of recesses 98f in the turntable associated with switch 96f are angularly located to actuate their switch when the turntables are in either a 120° or a 300° angular orientation in the particular direction of rotation relative to the 0° reference. Actuation of a particular limit switch may be used as indication of a particular rotational orientation upon which rotational control action is based, either manually or automatically.

Motor control unit 71 in its simplest sense includes switch means for selectively applying energizing current to motor 66, either to effect clockwise rotation or counterclockwise rotation. The selection of the direction of rotation and the timing of the starting and stopping of the motor may be done manually, in response to signals indicative of the rotational orientation of the turntables 56 relative to base 34, or these functions may be accomplished automatically in response to a preselected program using the signals indicative of rotational orientation for direct control.

With the above described arrangement it is possible to effect movement of carriage 32 in any of the six equiangularly spaced directions relative to a hole 18 which will place the retracted fingers 38 in alignment with with another hole 18. It will be generally preferable to alternate the direction of rotation of turntables 56 for each step, if practical, to avoid excessive twisting of the air conduits which are carried by the turntable. Carriage 32 will describe a serpentine path along a straight line resultant such as arrows 28 or 30.

For brevity, only the air circuit for one turntable 56 has been described and shown, but it will be appreciated that the operations and functions of the remaining turntables is identical and they are operated in parallel. For instance, conduit 78a might actually be four conduits connected in common at one end to valve 85a and separately at their other ends each to a port 79a in a different one of the four turntables 56. This technique would be repeated for each of the other aforementioned air circuits in keeping with the division of the fingers 38 into but two function groups, "a" and "b."

Figure 8:
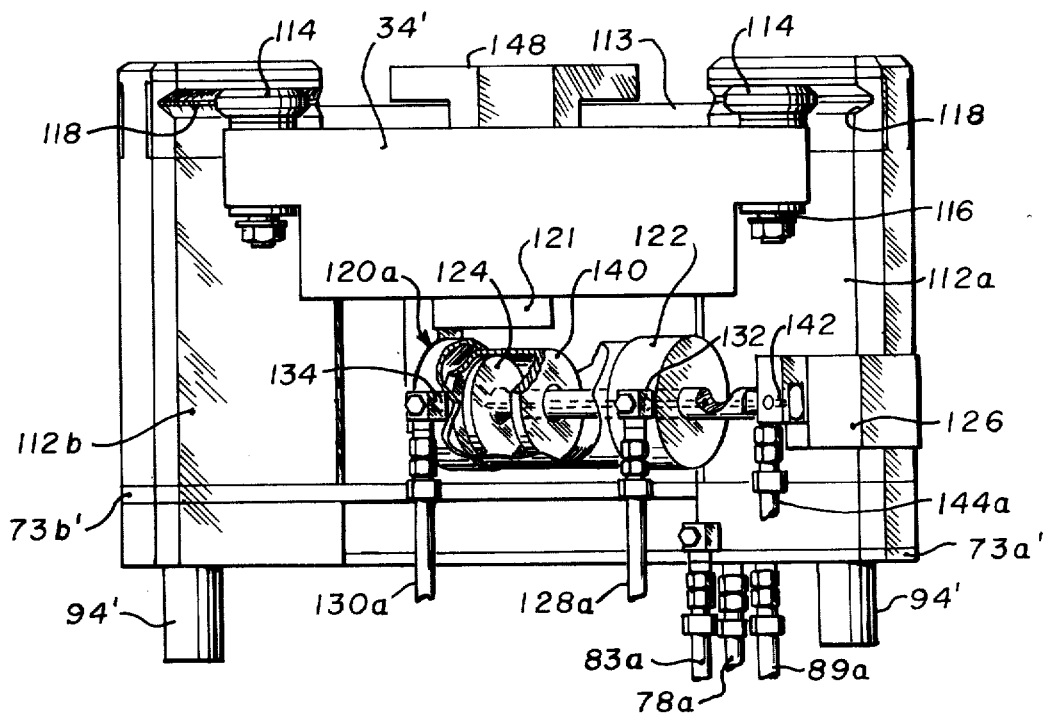
FIG. 8 is an elevational view of the carriage of FIG. 7 having portions cut away for greater clarity.
Figure 9:
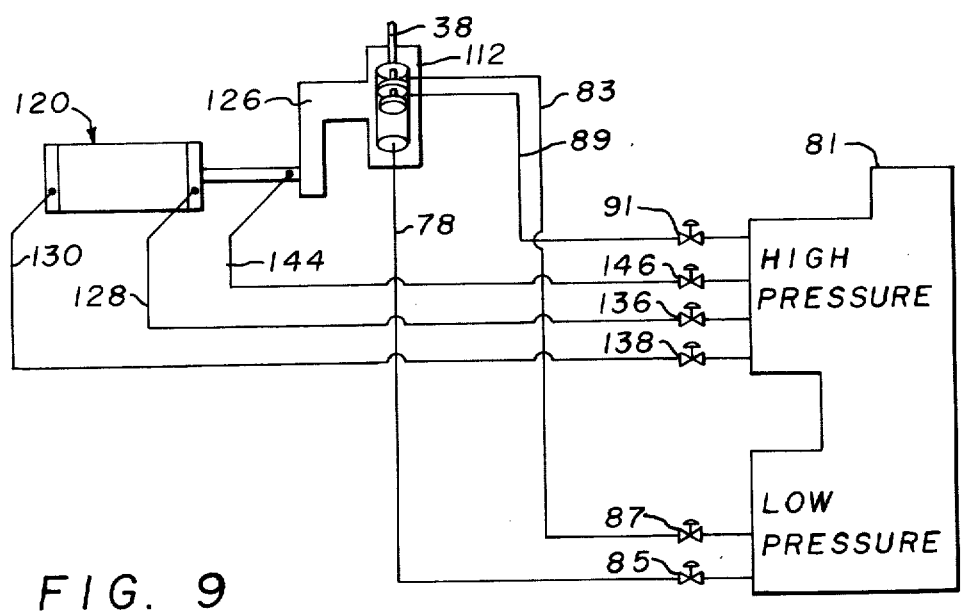
FIG. 9 is a schematical diagrammatical view of the actuation and control means associated with one slider and an anchoring finger therewith.

A second embodiment of the carriage is depicted in FIGS. 7-9. Those elements which are functionally and structurally identical to elements in FIGS. 4, 5 and 6 are given the same numbers as those elements. The elements, or combinations thereof, which are only similar or analogous to portions of FIGS. 4, 5 and 6 are given the same number primed (').

Referring to FIGS. 7 and 8, there is depicted a carriage which comprises essentially a base member 34' and a stepping mechanism 36' connected to said base 34'. As with the previous embodiment, stepping mechanism 36' is adapted to be limitedly moved relative to base 34' in a manner which propels the base and carriage parallel the surface of tube sheet 16. The stepping mechanism 36' also includes two or more substantially rigid, parallel fingers, 38 extending outwardly from base 34'. However, in the present embodiment the fingers 38 are connected to base 34' by means which translate linearly relative to the base, rather than by the turntables 56 which effected a relative curvilinear translational movement between the finger and base 34. Instead of turntables, the present embodiment utilizes a pair of sliding arms, or sliders, 110a and 110b as movable mounts for fingers 38. Subscripts a and b may be used, as in the previous embodiment, to identify elements associated and operating with a particular one of the two function groups.

Each slider 110a and 110b supports and houses one and preferably two fingers 38 in linearly moving relationship therewith in a manner substantially the same as in the previous embodiment. The fingers 38, finger pistons 76, sleeves 82 and 86 and pistons 88 each are identical to those of the prior embodiment with the pistons 82 and 86 mounted for movement in cylinders 72a and 72b which are also the same as previously. The air conduits 78, 83 and 89 to each function group are generally as described earlier; however, the branching of a conduit within a function group may occur nearer the cylinders 72 than in the previous embodiment, due to the non-rotary motion of this embodiment. However, the positioning of cylinders 72a and 72b, and accordingly fingers 38, relative to one another differ somewhat and will be described in greater detail below.

The base 34' comprises a member 112 which is preferably of a strong light material such as aluminum or magnesium and is, in plan view, in the form of a pair of "E's" back to back and having a short cross arm at the outer end of the middle arm of each E. The lateral extent of base 34' may be some 8 to 10 inches and it may be an inch or more in thickness.

The sliders 110a and 110b each comprise a pair of laterally spaced, parallel, vertically extending housing members 112 connected at or near their upper ends by a transversely extending rigid connecting arm 113. Arm 113 and members 112 may be integrally formed of aluminum or magnesium or the like. Each member 112 includes a cylinder 72 extending vertically therein which houses a finger 38. A cover member 73' is affixed to the underside of each member 112 to sealingly close the lower end of each cylinder 72. The cover member 73' for the two members 112 of each slider may be formed as a single member having a rigid transversely extending arm extending between the undersides of the two members 112 of the slider to maintain their spacing. Two vertical cylindrical bores or tubes 94' extend through or are affixed to each slider 110a and 110b at or near laterally opposite ends thereof preferably outward of fingers 38. Tubes 94' might additionally or alternately be positioned on or within base 34' along its outer perimeter however, certain advantages obtain if they may be variably positionable relative to the base as by movement of the sliders 110.

Each slider 110a and 110b is mounted on base 34' in a manner permitting its linear reciprocation relative thereto in a plane normal to the longitudinal or vertical extent of fingers 38. A pair of slider-supporting rollers 114 are mounted at each diagonally opposite laterally outer corner of base 34'. Each roller 114 is horizontally disposed for rotation about a vertical axis provided by a mounting bolt or pin 116. Each pin 116 is captively retained on or in base 34' against substantial vertical or lateral motion relative thereto and a roller 114 is retained thereon against substantial vertical or lateral motion relative thereto. A small amount of vertical motion of the roller and/or pin 116 relative to the base 34' is desirable so that the roller, and accordingly the slider 110 therewith, may fall away from the tube sheet 16 slightly when that slider is being moved relative to the tube sheet. Each roller 114 is free to rotate relative to base 34', whether relative to pin 116 or not, as the latter may also be allowed to rotate relative to the base. Rollers 114 are generally above base 34'.

A pin 116 and associated roller 114 is positioned near the extremity of each arm of the back-to-back E's of base 34' and at the extremities of the cross arms on the middle arms of the E's. These portions of the base 34' and accordingly the rollers 114 are positioned and spaced such that a pair of rollers are in laterally spaced opposition at each corner of the base. Each slider 110 is of such lateral length that it concurrently extends between a pair of rollers 114 at diagonally opposite ends of base 34' and is of such lateral width that it is in supported contact with the pairs of rollers 114. Preferably each slider 112 is wider than the space between a pair of rollers 114 and includes a pair of horizontally extending grooves or guides 118 along opposite sides thereof parallel the longitudinal extent of the slider at or near each end thereof. Guides 118 each receive a portion of the outer periphery of a roller 114 therewithin and are in rolling and supported contact therewith.

The arm 113 of one slider 110 extends or crosses over the arm of the other slider in non-interfering relationship, both above base 34'. The sliders 110a and 110b cross one another at an angle which corresponds to the angle made between intersecting rows of holes 18 in the tube sheet 16. For the tube sheet shown, this angle is conveniently 120° (with a supplementary angle of 60°) in accordance with the angle revealed by the intersection of directional arrows 28 and 30 in FIG. 3. It might be 90° for tubes having a square or rectangular pitch. In the rows of holes 18 paralleling the directional arrows 28 and 30, each hole in the rows of both directions is uniformly spaced from the immediately adjacent hole in that row and this spacing is the same in both intersecting directions. This uniformity of spacing of holes 18 in the directions paralleling the extent of sliders 110a and 110b permits a uniformity of spacing of fingers 38 thereon and a uniformity in length of lateral thrust of each slider relative to base 34'.

Fingers 38a at opposite ends of slider 110a are spaced from one another by some integer number times the "unit distance" between centers of adjacent pair of holes 18. Typically, this spacing might be 5 to 10 times the unit distance. Further, probe tubes 94' are also spaced from fingers 38 by a integer multiple of the unit distance, usually one. Tubes 94' in the depicted embodiment are centered in the same plane that extends vertically through the center lines of the fingers 38 of a slider.

Each slider 110 is of sufficient length that it may be reciprocated longitudinally an extent corresponding to some integer number, preferably two, times the unit distance between an adjacent pair of holes 18 in supported engagement with rollers 114. Reciprocation of each slider 110a and 110b is effected by means of respective motors, preferably linear motors, such as fluid actuated piston and cylinder combinations 120a and 120b respectively. It will be appreciated that such linear motion might also be obtained by converting the rotary motion of a motor to linear motion, as with a rack and pinion. Each piston and cylinder combination 120a and 120b includes at least a cylinder 122 affixed to base 34' or a rigid appendage 121 thereof, against longitudinal motion and a piston 124 reciprocably movable therewithin longitudinally thereof. A longitudinally extending connecting rod 125 joins at one end to the piston and at the other end to a flange 126. The piston and cylinder combinations 120a and 120b are both horizontally disposed and respectively extend longitudinally parallel sliders 110a and 110b. Flange 126 a is rigidly affixed to slider 110a near an outboard end thereof as is flange 126b near an outboard end of slider 110b. The connecting rods 125 of piston and cylinder combinations 120a and 120b are respectively connected to flanges 126a and 126b against longitudinal motion relative thereto and act to transmit the longitudinal motion of piston 124 to the flange.

If the sliders 110 are to have a single stroke capability, each piston-cylinder combination 120a and 120b will preferably include a pair of flexible fluid conduits 128a and 130a and 128b and 130b respectively connected thereto through ports 132 and 134 respectively at or near the forward and rearward ends the cylinders 122 thereof for driving the respective pistons 124 from one extreme of the cylinder to the other in a well known manner. Only the a subscripted air circuits are shown in FIG. 8. The air circuits to the b subscripted function group are omitted for brevity, but are identical to those of the a subscripted function group. However, they are independent of one another. Conduits 128a, 128b, 130a and 130b are each connected to a pressurized supply of air 81' seen in FIG. 9. As the a and b subscripted air circuits are identical, the subscripts have been omitted from FIG. 9 and a full set of air circuits for only one function group are depicted.

Control valves 136a and 136b are located in conduits 128a and 128b respectively and control valves 138a and 138b are located in conduits 130a and 130b respectively, to control the admission or exhaust of the driving fluid respectively to or from the front and rear portions of cylinders 122.

However, it may be desirable to provide a double stroke capability to the sliders 110 whereby each may be reciprocated to three discrete positions rather than two. This will extend the range of probe tubes 94' at a given positioning of base 34' relative to the tube sheet 16 and may be particularly useful in aligning the probe tubes with holes 18 at the outermost perimeters of the tube sheet.

In order to provide the double stroke capability, each piston and cylinder combination 120a and 120b additionally includes a hollow cylindrical piston 140 within cylinder 122 in fluid sealed sliding relationship therewith and includes the piston 124 therewithin in fluid sealed sliding relationship therewith. The rearward end of piston 140 is closed so that it may act like a piston and the forward end includes a radially inwardly extending projection to retain piston 124 captive therewithin.

The piston and cylinder combination 120a and 120b are structured such that one stroke length is equal to the unit distance between centers of an adjacent pair of holes 18. A double stroke is twice this length, but is accomplished in two discrete steps, each equal to the unit distance. Accordingly, outer piston 140 is of such length relative to cylinder 122 that its length of longitudinal freedom within cylinder 122 is equal to one stroke length and piston 124 and the interior of piston 140 are sized longitudinally relative to one another such that the extent of longitudinal freedom of the piston 124 within piston 140 is also one stroke length, or unit distance.

A tubular port or duct 142 extends axially rearward through each connecting rod 125 and continues axially through each piston 124. The forward end of each port 142 extends radially outward through each rod 125 near its forward end and a fluid conduit 144 is operatively connected thereto, with conduit 144a connected to the port 142 of connecting rod 125 for combination 120a and conduit 144b connected to the port 142 of connecting rod 125 for combination 120b.

Conduits 144a and 144b are connected to a source of fluid, such as air supply 81'. Control valves 146a and 146b respectively are located in conduits 144a and 144b to control the admission and exhaust of air respectively to and from the region between the back surface of piston 124 and the rear closure of piston 140.

In viewing operation of the two-stroke piston-cylinder combination 120, it is assumed that both piston 140 and piston 124 are initially withdrawn. If air is introduced through port 134 behind piston 140, it will be caused to move forward to its forward limit position against the front of cylinder 122, this being the extent of the first stroke. During such time a lesser air pressure may be maintained in the forward end of cylinder 122 to allow forward movement of cylinder 140, but to maintain piston 124 rearwardly in cylinder 140. This might be accomplished by placing three-way valve 136 in a position which prevents or impedes exhaust of air from the cylinder. While maintaining air pressure in the rear portion of cylinder 122, air is introduced to cylinder 140 behind piston 124 via port 142 to forwardly advance the piston relative to cylinder 140 to its forward limit position, this being the extent of the second stroke. The fully withdrawn position is obtained by venting through ports 134 and 142 and admitting air through port 132.

The carriage 32' of FIG. 7 is shown with each slider 110 in its intermediate position, with the phantom portions 110' and 110'' respectively illustrating the sliders in the fully extended and the fully retracted positions. For any particular positioning of base 34' relative to tube sheet 16, a probe tube 94' may be moved into alignment with any one of three holes 18 along the line of reciprocation of the slider 110 supporting the tube 94'.

In order to move or step the carriage 32' in one of the two directions in which it may move, as indicated by arrows 28 and 30 of FIG. 3, the fingers 38 (a or b) associated with the slider 110 (a or b) extending in that direction are retracted as described in the previous embodiment and that slider (for instance 110a) advanced one stroke length in that direction as described above. This assumes that a stepping operation starts from an intermediate positioning of the slider 110a relative to base 34'. When the slider 110a has been advanced, the fingers 38 therewith are extended, and flexible sleeves 82 expanded to grip the interior walls of openings 18. The sleeves 82 of the fingers 38 of the other slider 110b are relaxed and the fingers retracted from openings 18 and the previously moved slider 110a is reciprocated in the reverse direction relative to base 34' one stroke length. This latter operation has the effect of advancing base 34' and slider 110b with respect to their previous positioning relative to tube sheet 16. It also repositions slider 110a to its intermediate positioning relative to base 34'. Slider 110b is moved transversely of its longitudinal extent. The retracted fingers may be re-extended and inserted and sleeves 82 expanded to establish and firmly support carriage 32' at its new positioning. Carriage movement at 120° to this above described movement is accomplished by reversing the roles of sliders 110a and 110b relative to the above description. Carriage movement rearward 180° of either of these above described moves is accomplished by reversing the directions detailed above 180°.

For monitoring the location of carriage 32' it may be convenient to refer to the positioning of its base 34' relative to tube sheet 16. More specifically, it may be preferable to refer to the center of base 34' which is in vertical alignment with the center of intersection of sliders 110a and 110b. It is evident that this center of reference on base 34', in the described embodiment, may not itself be aligned with any of the holes 18 which are receiving some work operation, such as inspection, at a particular positioning. However, the sliders 110 and probe tubes 94' bear a known relationship thereto. A mounting plate 148 may be affixed to base 34' and extend over the region of intersection of sliders 110a and 110b to serve as a mount for limit switches, not shown here, which may coact with and monitor the positionings of the sliders relative to the base.

In monitoring the location of carriage 32 and 32', various techniques may be employed. Remote visual techniques, such as television, might be used. Preferably, however, techniques may be employed which initially establish its location relative to tube sheet 16 when first placed against the undersurface of the tube sheet and which then "remember" the direction and amplitude of each step taken by the carriage. This latter technique will generally require identifying each tube opening 18 on the basis of its position in some coordinate system, as for instance a Cartesian coordinate system. As the direction and amplitude of each step is known from the control action taken to effect the step, it is possible to plot and monitor the movement of the carriage across the tube sheet surface. This may all be done manually, the control of movement of the carriage and the plotting or "remembering" of its precise positioning from step to step, or one or both functions may be accomplished automatically or semi-automatically with the control action taken serving as informational inputs to the location monitoring system. If the carriage 32 is to be controlled automatically, the various air control valves and electrical supply control circuits will be capable of automatic, preferably electromechanical, operation; whereas, if manual control is intended, these elements will be capable of manual operation.

It is the intention of the invention that the carriage 32 preferably be self-supporting relative to tube sheet 16 by use of gripping means associated with the fingers and operative to securely engage the inner wall of opening(s) into which the finger(s) is or are inserted, as by expansion of sleeve 82. However, it may be impractical or impossible to provide sufficient holding capability thereby if the loads are excessive, as might be true if carriage 32 is utilized as a platform from which remotely controlled work functions such as tube plugging are effected.

As a supplement, or possibly an alternative, to the vertical support provided by sleeves 82, alternate support means may be provided which are supported within and by the steam generator 10 and which in turn support carriage 32 is substantially constant vertical relationship relative to the undersurface of tube sheet 16.

These supplemental support means might be particularly helpful during periods of extreme downward loading of carriage 32, as during a plug inserting operation. Such support means should be quickly and easily installed within steam generator 10 and should, with a single installation, allow complete lateral freedom of carriage 32 on one side of divider 20. Following completion of operation of carriage 32 on one side of divider 20, it will be necessary for an operator or remote handling device to re-enter the steam generator to install the carriage under tube sheet 16 on the other side of the divider if it is to be used thereat.

One type of supplementary support means is shown in FIG. 1 and is termed a "support stand" 42. Support stand 42 may include a footing which rests on the bottom of the vessel 12 and has a body which extends upward and may be secured against the undersurface of tube sheet 16 or inserted into a hole 18 therein to give it lateral and vertical stability. Support stand 42 may further include a multi-jointed arm of sufficient length to allow lateral coverage of the area of tube sheet 16. The multi-jointed arm is of the type used on dental trays in which several arm segments are pivotally joined to the ends of one another each for rotation about a vertical axis common to the two joined segments. The carriage may be supported by the arm at its outer end for rotation relative thereto about a vertical axis. The outer end of the arm is sufficiently elevated to position the carriage proximate the undersurface of the tube sheet.

Additionally, biasing means might exist at the arm's end for urging the carriage 32 upward relative thereto into contact with the undersurface of tube sheet 16.

If any human exposure to the environment within steam generator 10 is to be avoided, remotely actuated supplementary support means carried by the carriage 32 itself might be utilized. An example of such supplemental support means would be one or more telescoping stilts, adapted to be extended downwardly from carriage 32, as by fluid pressure, into supporting contact with the bottom or head of steam generator 10.

While the carriage 32 has been described in the context of a work platform from which inspection probes may be remotely thrust into tubes 14, it might of course also be used as a movable platform from which other work functions, such as tube plugging, might be remotely effected.

It will be understood that the embodiment shown and described herein is merely illustrative and that changes may be made without departing from the scope of the invention as claimed.

What is claimed is:

1. A carriage for remotely controlled travel laterally of the surface of a member having a plurality of laterally spaced longitudinally extending openings in said surface thereof, comprising:
   a. a base;
   b. a stepping mechanism for said base including at least two substantially parallel fingers connected to said base and extending outward therefrom and being reciprocably movable in a first direction between extended and retracted positions relative to said base and sized for insertion in said member openings and at least one said finger being movable relative to said base a predetermined extent and in a second direction extending in a plane substantially normal to the longitudinal extent of said finger to step said base;
   c. means for supporting said base proximate said surface of said member to allow insertion of said fingers in said openings in their said extended positions and to prevent said insertion in their said retracted position;
   d. first remotely actuable means for selectively extending and retracting each said finger;
   e. second remotely actuable means for moving said at least one finger relative to said base in a said second direction in said plane substantially normal to said finger; and
   f. means for controlling actuation of said first and said second remotely actuable means, whereby said relative motion in said second direction between said at least one finger and said base acts to advance said base laterally relative to said member when said at least one finger is extended into said opening.

2. The apparatus of claim 1 wherein at least two of said fingers are movable relative to said base each in a said second direction substantially normal to the longitudinal extent of said fingers and said second remotely actuable means engage all said movable fingers for movement relative to said base.

3. The apparatus of claim 1 wherein a finger is in its said retracted position during said relative motion in said direction between said base and said at least one extended finger and said extent of said motion of said at least one finger relative to said base in said second direction is at least sufficient to laterally advance said retracted finger the distance between an adjacent pair of openings in said member.

4. The apparatus of claim 3 wherein said fingers are at least four in number, said fingers being divided functionally into two groups comprising each at least two different fingers having a lateral spacing therebetween corresponding to that of two said member openings and being movable relative to said base in said second direction; said second remotely actuable means movingly engage each said movable finger; and said control means are operative to actuate said first means associated with the fingers of one said group independently of said first means associated with the fingers of said other group.

5. The apparatus of claim 4 wherein said second means include a plurality of turntables connected to said base in laterally spaced relationship for rotation relative to said base each about an axis normal to said base and selectively actuable means for rotating said turntables; and two fingers are connected to each said turntable and are eccentrically positioned thereon relative to said axis of rotation, said two fingers comprising one from each said functional group.

6. The apparatus of claim 5 wherein each said turntable comprises a housing member having two cylindrical bores therein each off-set from and parallel the axis of rotation of said turntable center and a said finger is telescopingly housed in each said bore and is reciprocably movable relative thereto between said extended and retracted positions.

7. The apparatus of claim 5 wherein said base supporting means include means with said fingers for retainedly engaging the surface of said opening when inserted thereinto, whereby to supportingly connect said carriage with said member.

8. The apparatus of claim 7 wherein said opening surface engaging means include means for frictionally engaging the surface of said openings, said means being laterally extensible into and retractable from retained engagement with said surface; third remotely actuable means for selectively laterally extending and retracting said surface engaging means are operatively connected therewith; and said control means are operative to control actuation of said third means.

9. The apparatus of claim 5 wherein said two fingers connected to a said turntable are spaced from one another laterally a particular distance, said distance corresponding to the distance between a pair of laterally spaced openings in said member.

10. The apparatus of claim 9 wherein said openings in said member are uniformly and repetitively spaced in a particular direction and said two fingers on said turntable are spaced said uniform distance.

11. The apparatus of claim 10 wherein the axis of rotation of each said turntable and the longitudinally extending center lines of both said two fingers thereon are in a common plane, said turntable axis of rotation being intermediate said two fingers.

12. The apparatus of claim 1 wherein said at least one finger is mounted for curvilinear translational movement relative to said base in said second direction.

13. The apparatus of claim 12 wherein said second means include a turntable connected to said base for rotation relative thereto about an axis normal to said base and selectively actuable means for rotating said turntable, said at least one finger is connected to said turntable and eccentrically positioned thereon relative to said axis of rotation.

14. The apparatus of claim 13 wherein said turntable comprises a housing member having a cylindrical bore therein off-set from and parallel to the axis of rotation of said turntable member and said at least one finger is telescopingly housed in said bore and is reciprocably movable relative thereto between said extended and retracted positions.

15. The apparatus of claim 2 wherein said means for supporting said base comprise: means 1 with each of at least two said fingers for retainedly engaging a surface of said openings when said fingers are inserted thereinto; third remotely actuable means for selectively moving said surface engaging means into and out of engaging contact with said surface; and said control means are operative to control actuation of said moving means for said surface engaging means.

16. The apparatus of claim 15 wherein said finger is a rigid longitudinally extending member including a first longitudinally facing lip affixed thereto and said surface engaging means comprise:
   a. a sleeve disposed about said finger and longitudinally slidable relative thereto having a second longitudinally facing lip in opposed spaced relationship with said first lip; and
   b. an elastically deformable material disposed about said finger between said first and second lips, and having an external cross-sectional geometry substantially that of a said opening, said material being relatively expanded laterally when subjected to relative compression longitudinally for frictional engagement with said opening surface and said third remotely actuable means being operative to move said first and second lips relatively toward one another for relatively compressing said material.

17. The apparatus of claim 15 wherein said finger is a rigid, longitudinally extending plunger having laterally extending retaining means longitudinally outward thereon and said surface engaging means comprise a sleeve about said plunger longitudinally slidable between first and second positions relative to said retaining means and elastically deformable means disposed about said plunger intermediate said retaining means and said sleeve, said deformable means being relatively contracted laterally in said first relative position of said sleeve and retaining means and relatively expanded in said second relative position;
   wherein said first remotely actuable means comprise a longitudinally extending cylinder affixed to said base against longitudinal motion relative thereto, a first piston affixed to said plunger and slidable within said cylinder between extended and retracted positions, and means for admitting driving fluid to said cylinder to move said first piston between said extended and retracted positions; and
   said third remotely actuable means comprise a second piston affixed to said sleeve and spaced longitudinally outward of said first piston and slidable within said cylinder and means for admitting drive fluid to said cylinder intermediate said first and second pistons for moving said sleeve and retaining means to said second relative positioning therebetween.

* * * * *